United States Patent
Jones et al.

(10) Patent No.: US 7,055,306 B2
(45) Date of Patent: Jun. 6, 2006

(54) COMBINED STAGE SINGLE SHAFT TURBOFAN ENGINE

(75) Inventors: Anthony Jones, San Diego, CA (US); Mark Harris, San Diego, CA (US); Patrick Lydon, San Marcos, CA (US); Eric Alexander, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 19 days.

(21) Appl. No.: 10/426,315

(22) Filed: Apr. 30, 2003

(65) Prior Publication Data

US 2004/0216445 A1 Nov. 4, 2004

(51) Int. Cl.
*F02K 3/02* (2006.01)

(52) U.S. Cl. .......... 60/226.1; 60/262; 415/144

(58) Field of Classification Search .......... 60/226.1, 60/262, 263, 269; 415/144, 145, 116, 117
See application file for complete search history.

(56) References Cited

U.S. PATENT DOCUMENTS

| | | | | |
|---|---|---|---|---|
| 2,635,420 A | * | 4/1953 | Jonker | 60/226.1 |
| 3,486,328 A | * | 12/1969 | Boudigues | 60/39.181 |
| 3,528,246 A | * | 9/1970 | Fischer | 60/226.1 |
| 3,540,682 A | * | 11/1970 | Ferguson et al. | 244/53 R |
| 3,546,882 A | * | 12/1970 | Berkey | 60/204 |
| 3,549,272 A | * | 12/1970 | Bouiller et al. | 416/166 |
| 3,713,748 A | * | 1/1973 | Langley | 415/77 |
| 3,729,957 A | * | 5/1973 | Petrie et al. | 60/226.1 |
| 3,830,058 A | * | 8/1974 | Answorth | 60/226.1 |
| 3,867,813 A | * | 2/1975 | Leibach | 60/225 |
| 3,922,852 A | | 12/1975 | Drabek | |
| 3,956,887 A | | 5/1976 | MacDonald | |
| 4,005,575 A | * | 2/1977 | Scott et al. | 60/226.1 |
| 4,040,249 A | | 8/1977 | Kahle et al. | |
| 4,043,121 A | * | 8/1977 | Thomas et al. | 60/204 |
| 4,080,785 A | | 3/1978 | Koff et al. | |
| 4,177,638 A | | 12/1979 | Wood | |
| 4,222,234 A | | 9/1980 | Adamson | |
| 4,287,715 A | | 9/1981 | Klees | |
| 4,751,816 A | * | 6/1988 | Perry | 60/226.1 |
| 4,791,783 A | * | 12/1988 | Neitzel | 60/262 |
| 4,794,754 A | | 1/1989 | Shekleton et al. | |
| 5,131,223 A | | 7/1992 | Owen | |
| 5,150,567 A | | 9/1992 | Farrell | |
| 5,177,957 A | | 1/1993 | Grieb | |

(Continued)

FOREIGN PATENT DOCUMENTS

EP 1 113 162 A2 7/2001

*Primary Examiner*—William H. Rodriguez
(74) *Attorney, Agent, or Firm*—Carlson, Gaskey & Olds

(57) ABSTRACT

A turbofan engine includes a combined stage rotor mounted for common rotation with a shaft, a compressor stage, and a turbine stage. Each of the plurality of fan blades of the combined stage rotor are contiguous with a respective compressor blade. The combined stage rotor is located at a junction between a fan bypass duct and a core duct. The fan bypass stage portion includes a plurality of the fan blades which communicate incoming airflow into fan bypass airflow through the fan bypass duct. The compressor stage portion includes a plurality of the compressor blades which communicated airflow into core airflow through the core duct. The plurality of fan blades extend substantially perpendicular to the plurality of compressor blades such that the plurality of compressor blade portions extend at least partially into the core duct and preferably will include splitters for enhanced efficiency.

26 Claims, 2 Drawing Sheets

U.S. PATENT DOCUMENTS

| | | | |
|---|---|---|---|
| 5,237,817 A * | 8/1993 | Bornemisza et al. ........ 60/226.1 |
| 5,261,227 A * | 11/1993 | Giffin, III ................. 60/226.31 |
| 5,274,999 A | 1/1994 | Rohra et al. |
| 5,282,358 A | 2/1994 | Schilling |
| 5,327,716 A * | 7/1994 | Giffin, III et al. ............. 60/772 |
| 5,562,419 A * | 10/1996 | Crall et al. .................. 416/190 |
| 5,692,372 A | 12/1997 | Whurr |
| 5,782,079 A | 7/1998 | Chiang et al. |
| 5,867,980 A | 2/1999 | Bartos |
| 5,924,279 A | 7/1999 | Seyfang |
| 5,996,336 A | 12/1999 | Hamedani |
| 6,170,251 B1 | 1/2001 | Skowronski et al. |
| 6,260,800 B1 | 7/2001 | Snell |
| 6,339,927 B1 | 1/2002 | DiPietro, Jr. |
| 6,351,940 B1 | 3/2002 | Guinan et al. |
| 6,358,003 B1 | 3/2002 | Schlechtriem |
| 6,370,864 B1 | 4/2002 | Murphy |
| 6,374,592 B1 | 4/2002 | Box et al. |
| 6,378,293 B1 | 4/2002 | Care et al. |
| H2032 H | 7/2002 | DiPietro, Jr. |
| 6,430,917 B1 | 8/2002 | Platts |
| 6,438,941 B1 | 8/2002 | Elliott et al. |
| 6,477,842 B1 | 11/2002 | Nagata et al. |
| 6,578,351 B1 * | 6/2003 | Modafferi .................. 60/39.08 |

* cited by examiner

COMBINED STAGE SINGLE SHAFT TURBOFAN ENGINE

BACKGROUND OF THE INVENTION

The present invention relates to a miniature turbofan engine, and more particularly to a combined stage rotor which combines a fan and compressor into single stage.

Miniature turbojet engines are often utilized in single usage applications such as reconnaissance drones, cruise missiles, decoy and other weapon applications. Although providing high thrust, conventional miniature turbojet engines typically consume relatively large quantities of fuel. High fuel consumption reduces the effective range of the aforementioned vehicles.

Turbofan engines are conventionally utilized in commercial and military applications as such engines provide high thrust and fuel efficiency. Turbofan engines are relatively complex and heretofore have not been often utilized in a miniaturized form for single usage applications due to their expense.

Accordingly, it is desirable to provide a turbofan engine which provides high thrust and fuel efficiency with a relatively inexpensive and uncomplicated design.

SUMMARY OF THE INVENTION

The turbofan engine according to the present invention provides a combined stage rotor mounted for common rotation with a shaft compressor stage and turbine stage. The combined stage rotor is located at the junction between a fan bypass duct and a core duct. The fan bypass stage portion and the compressor stage portion is a single unitary wheel which rotates with the shaft, the compressor, and the turbine.

The fan bypass stage portion includes a plurality of fan blades which communicate incoming airflow into fan bypass airflow through a fan bypass duct. The compressor stage portion includes a plurality of compressor blade portions which communicated in common airflow into core airflow through a core duct. The plurality of fan blades define an outer diameter greater than the plurality of compressor blade portions. The plurality of fan blades also extend substantially perpendicular to the plurality of compressor blade portions such that the plurality of compressor blade portions extend at least partially into the core duct.

As the fan bypass stage portion and the compressor stage portion rotates with the single common shaft, the compressor stage portion boosts the pressure ration and power of the core thereby providing high thrust and fuel efficiency with a relatively inexpensive and uncomplicated design.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
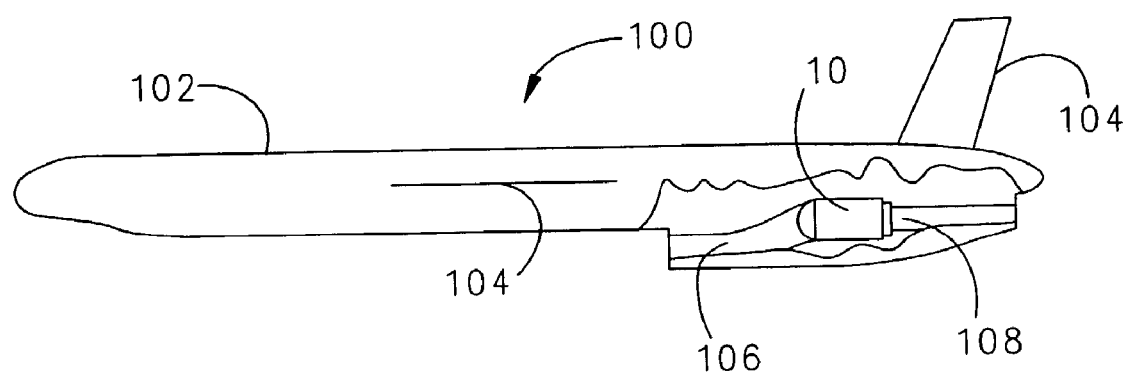
FIG. 1 is a general perspective view an exemplary vehicle embodiment for use with the present invention.

FIG. 1 illustrates a general schematic view of a vehicle 100 including a turbofan engine 10 according to the present invention. The vehicle 100 includes a body 102 and one or more aerodynamic surfaces 104. The engine 10 is coupled to, or within, the body 102. An intake 106 provides air to the turbo fan 10, and an exhaust pipe 108 is adapted to exhaust the thrust from the turbofan 10. It should be understood that multiple intakes and exhaust will benefit from the present invention. The turbofan engine of the present invention may also be used in other single usage and reusable applications such as reconnaissance drones, cruise missiles, decoys and other weapon and non-weapon applications.

Figure 2:
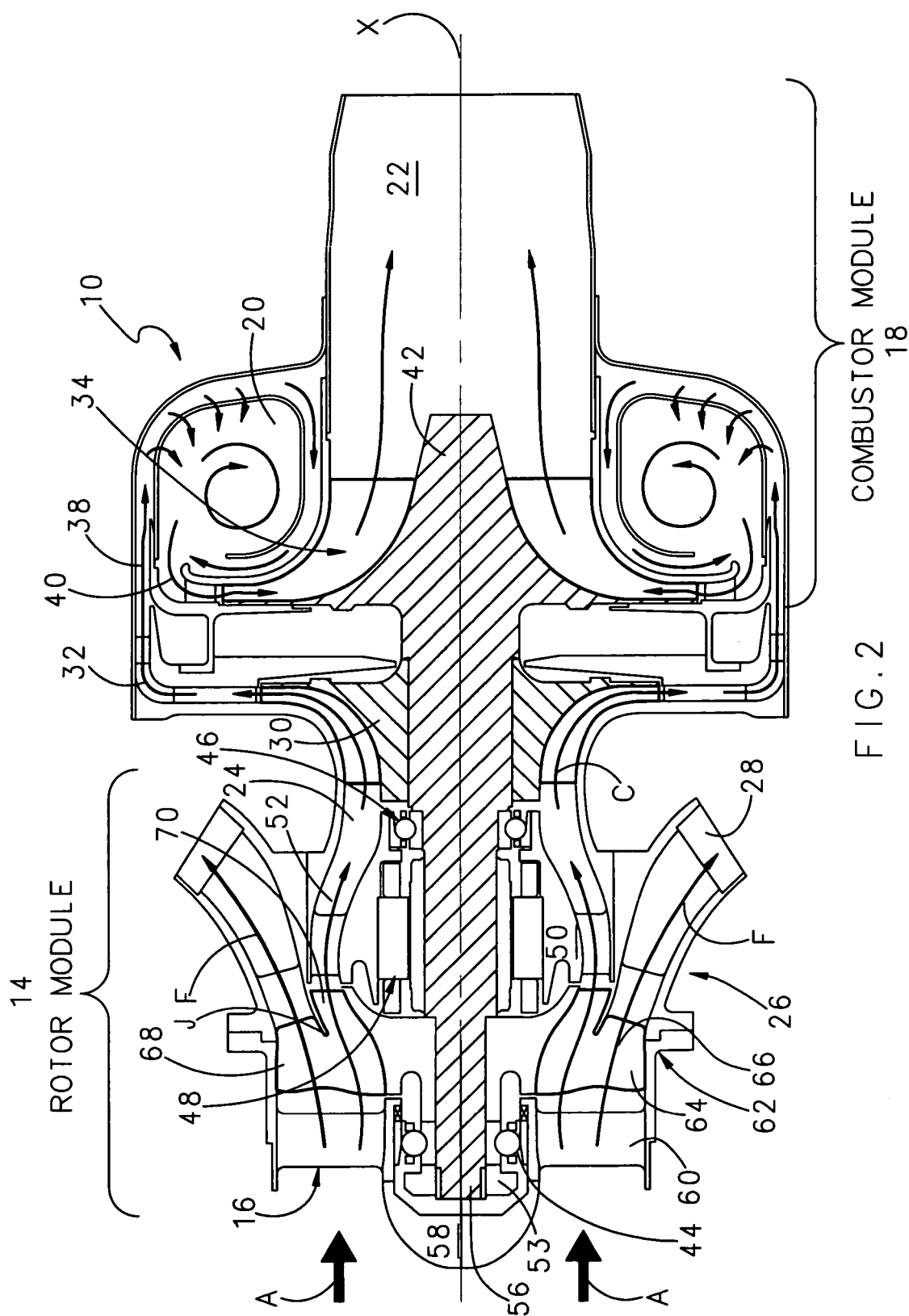
FIG. 2 is a sectional view of a turbofan engine, specifically a turbofan embodying a combined stage rotor according to the invention.

Referring to FIG. 2, the turbofan engine 10 includes a housing 12 defining a longitudinal axis X, a rotor module 14 having a forward inlet 16, and a combuster module 18 including a combustion 20 and an exhaust pipe (nozzle) 22. The turbofan 10 is defined by a core section 24 at least partially surrounded by a fan bypass section 26.

As generally understood, airflow A entering the forward inlet 16 is split between fan bypass airflow (illustrated schematically by arrow F) and core airflow (illustrated schematically by arrow C). The fan bypass airflow F passes through the fan bypass section 26 where it is communicated overboard through a fan bypass duct 28. The core airflow C passes through the core section 24 where it is heated and compressed prior to being exhausted through the exhaust pipe 22.

A compressor 30 and a compressor diffuser 32 are provided between the inlet 16 and the combustor 20. A turbine 34 is provided between the combustion 20 and the exhaust pipe 22. The compressor 30 discharges in a radial direction to the diffuser 32. The compressed air is then directed to a plenum 38 about the combustor 20 and enters the same to provide for the combustion of fuel within the combustor 20.

The combustor 20 includes an outlet 40 to the turbine 34 so as to rotate the turbine stage 34. A shaft 42 is rotatably mounted on a forward bearing 44 and an aft bearing 46 to couple the compressor 30 and the turbine 34 stage together such that rotation of the turbine 34 cause rotation of the compressor 30. Most of the energy of the gases of combustion, however, is directed out of the exhaust 22 to provide thrust.

An electric starter generator 48 is coupled to the shaft 42 to spin the shaft 42 on starting the engine and to generate power during engine 10 operation. A fairing 50 mounted about the electric starter generator 48 preferably defines the core airflow C path through a core duct 52 in the core section 24 prior to communication with the compressor 30.

A forward extension 56 of the shaft 42 is preferably mounted in a forward fairing 58 located within the intake 16 by struts 60. The shaft 42 may be coupled to a fuel pump (illustrated somewhat schematically at 53) which provides fuel to the combustor 20 through fuel injectors (not shown) or the like.

A combined stage rotor 62 is preferably mounted for common rotation with shaft 42 upstream of the compressor 30. The combined stage rotor 62 is preferably located at a junction J between the fan bypass duct 28 and the core duct 52 such that the combined stage rotor 62 essentially spans the fan bypass section 26 and the core section 24.

The combined stage rotor 62 is a combined fan bypass stage portion 64 contiguous with a compressor stage portion 66. That is, the fan bypass stage portion 64 and the compressor stage portion 66 are a single unitary wheel which rotates with shaft 42, compressor 30, and turbine 34.

The fan bypass stage portion 64 includes a plurality of fan blades 68 which communicate incoming airflow A into fan bypass airflow F through the fan bypass duct 28. The compressor stage portion 66 includes a plurality of compressor blades 70 which communicate airflow A into core airflow C through the core duct 52. That is, each fan blade 68 is contiguous with a corresponding compressor blade 70 which respectively divides airflow A into fan bypass airflow F and core airflow C.

The plurality of fan blades 68 preferably define an outer diameter greater than the plurality of compressor blades 70. The plurality of fan blades 68 also preferably extend substantially perpendicular to the plurality of compressor blades 70 such that the plurality of compressor blade portions 70 extend at least partially into the core duct 52. That is, each fan blade 68 and each compressor blade 70 forms an essentially L-shaped rotor blade. It should be understood that various rotor shapes will benefit from the present invention depending upon the shape of the fan bypass duct 28 and the core duct 52 and their relative relationship.

In operation, the shaft 42 is spun up through the starter generator or other arrangement such as a solid fuel motor to rotate the combined stage rotor 62, the compressor 30 and the turbine 34 as air begins to enter the combustor 20. A vaporized liquid fuel, e.g., diesel fuel or Jet A kerosene, is injected into the combustor 20, such that the temperature is high enough to allow the liquid fuel to sustain itself in a stable, constant, burn. The burn of the liquid fuel heats the combustor 20 and the compressed air within, and the heated, high pressure air is expelled through the exhaust pipe 22. The turbine 34 absorbs the necessary energy from the expelled gases to power the compressor 30 and the combined stage rotor 62, with the greater part of the energy utilized to develop propulsive thrust.

As the fan bypass stage portion 64 and the compressor stage portion 66 rotates with shaft 42, the turbofan engine 10 provides high thrust and fuel efficiency with a relatively inexpensive and uncomplicated design which does not require independent counter rotating shafts or a separate fan stage.

The combined stage rotor according to the present invention can be manufactured sufficiently economically as to have, if desired, a single-usage capability. Moreover, the high fuel efficiency achieved by the turbofan construction achieved by the combined stage rotor is well suited for use in environments requiring a small envelope while providing for greatly extending the effective range of a single usage vehicle, such as in a missile.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A combined stage rotor blade for a turbofan engine comprising:
   a first rotor blade portion which communicates airflow toward a fan bypass section of the turbofan; and
   a second rotor blade portion contiguous and at least partially transverse with said first rotor blade portion, said second rotor blade portion communicates airflow toward a core section of the turbofan.

2. The rotor blade as recited in claim 1, wherein said first blade portion extends substantially perpendicular to said second blade portion.

3. The rotor blade as recited in claim 1, wherein said first blade portion defines a first outer diameter and said second blade portion defines a second outer diameter, said first outer diameter greater than said second outer diameter.

4. The rotor blade as recited in claim 1, wherein said first blade portion communicates airflow overboard.

5. The rotor blade as recited in claim 1, wherein said second blade portion communicates airflow toward a combustor of the turbofan.

6. The rotor blade as recited in claim 1, wherein said second blade portion extends at least partially within the core section.

7. A turbofan engine comprising:
   a fan bypass section;
   a core section;
   a shaft;
   a first rotor blade portion mourned for rotation with said shaft, said first rotor blade portion to communicate airflow toward said fan bypass section; and
   a second rotor blade portion contiguous and at least partially transverse with said first rotor blade portion, said second rotor blade portion mounted for rotation with said shaft to communicate airflow toward said core section.

8. The turbofan engine as recited in claim 7, wherein said second blade portion communicates airflow toward a combustor section.

9. The turbofan engine as recited in claim 7, wherein said second blade portion extends at least partially within said core section.

10. The turbofan engine as recited in claim 7, further comprising a second compressor wheel mounted to said shaft.

11. The turbofan engine as recited in claim 10, further comprising a turbine wheel mounted to said shaft downstream of said second compressor wheel.

12. The turbofan engine as recited in claim 7, wherein said first rotor blade portion and said second rotor blade portion form a combined stage rotor, said first rotor blade portion and said second rotor blade portion located adjacent a junction between a fan bypass duct of said fan bypass section and a core duct of said core section such that the combined stage rotor essentially spans said fan bypass section and said core section.

13. The turbofan engine as recited in claim 7, wherein said first rotor blade portion and said second rotor blade portion at least partially surround said junction.

14. The turbofan engine as recited in claim 13, wherein said first rotor blade portion extends at least partially into said fan bypass duct and said second blade portion extends at least partially into said core duct.

15. The turbofan engine as recited in claim 13, wherein said first blade portion extends substantially perpendicular to said second blade portion.

16. The turbofan engine as recited in claim 7, wherein said first rotor blade portion and said second rotor blade portion are located generally forward of said junction.

17. The turbofan engine as recited in claim 7, wherein said first rotor blade portion and said second rotor blade portion form a single L-shaped stage.

18. A turbofan engine comprising:
a combined stage turbofan engine mounted for rotation about an axis of rotation, said combined stage turbofan engine rotor having a fan bypass rotor blade portion contiguous and at least partially transverse with a compressor rotor blade portion.

19. The turbofan engine as recited in claim 18, further comprising a single shaft which mounts said combined stage rotor and a compressor mounted to said shaft downstream of said combined stage rotor.

20. The turbofan engine as recited in claim 19, further comprising a turbine mounted to said shaft downstream of said compressor.

21. The turbofan engine as recited in claim 18, further comprising a combustor section in communication with said compressor rotor blade portion such that said compressor rotor blade portion communicates airflow toward said combustor.

22. The turbofan engine as recited in claim 18, wherein said fan bypass rotor blade portion and said compressor rotor blade portion from a single L-shaped rotor blade of said combined stage rotor which communicates with both a fan bypass section of the turbofan and a core section of the turbofan.

23. The turbofan engine as recited in claim 18, wherein said fan bypass rotor blade portion and said compressor rotor blade portion are adjacent a junction between a fan bypass duct and a core duct.

24. The turbo fan engine as recited in claim 18, wherein said fan bypass rotor blade portion is radial outward and forward of said compressor rotor blade portion relative said axis of rotation.

25. A combined stage rotor blade for a turbofan engine comprising:
a first rotor blade portion which communication airflow toward a fan bypass section of the turbofan; and
a second rotor blade portion contiguous with said first rotor blade portion, said second rotor blade portion communicates airflow toward a core section of the turbofan, said first blade portion extends substantially perpendicular to said second blade portion.

26. A turbofan engine comprising:
a fan rotor blade stage portion contiguous with a compressor rotor blade portion, said fan bypass rotor blade portion and said compressor rotor blade portion form a single L-shaped rotor blade which communicates with both a fan bypass section of the turbofan and a core section of the turbofan.

* * * * *